US009432965B2

(12) United States Patent
Khemani et al.

(10) Patent No.: US 9,432,965 B2
(45) Date of Patent: Aug. 30, 2016

(54) DETERMINING WIRELESS COVERAGE INFORMATION USING WIRELESS ACCESS POINTS

(71) Applicant: Comcast Cable Communications, LLC, Philadelphia, PA (US)

(72) Inventors: Yash Lachmandas Khemani, Falls Church, VA (US); Thomas William Lynn, Jr., Berryville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 83 days.

(21) Appl. No.: 14/259,040

(22) Filed: Apr. 22, 2014

(65) Prior Publication Data
US 2015/0304984 A1    Oct. 22, 2015

(51) Int. Cl.
*H04W 64/00*    (2009.01)
*H04W 40/24*    (2009.01)
*H04W 16/18*    (2009.01)

(52) U.S. Cl.
CPC ........... *H04W 64/003* (2013.01); *H04W 16/18* (2013.01); *H04W 40/246* (2013.01)

(58) Field of Classification Search
CPC   H04W 64/003; H04W 40/246; H04W 16/18
See application file for complete search history.

(56) References Cited

U.S. PATENT DOCUMENTS

| | | | |
|---|---|---|---|
| 8,548,495 B2 * | 10/2013 | Waters et al. | 455/456.1 |
| 8,559,410 B2 | 10/2013 | Kalika et al. | |
| 8,582,431 B2 | 11/2013 | Johansen | |
| 8,971,919 B2 * | 3/2015 | Do et al. | 455/456.1 |
| 2007/0032219 A1 | 2/2007 | Rudolf et al. | |
| 2013/0148573 A1 | 6/2013 | Boland et al. | |
| 2013/0230028 A1 * | 9/2013 | Calcev | H04W 72/1231 370/336 |
| 2014/0066046 A1 * | 3/2014 | Keshavdas et al. | 455/419 |
| 2014/0211691 A1 * | 7/2014 | Emadzadeh et al. | 370/328 |
| 2015/0051975 A1 * | 2/2015 | Kadous | G06Q 30/0261 705/14.58 |
| 2015/0092574 A1 * | 4/2015 | Kuan et al. | 370/252 |
| 2015/0126215 A1 * | 5/2015 | Pandey | 455/456.1 |

FOREIGN PATENT DOCUMENTS

EP     2203024 A1    6/2010

OTHER PUBLICATIONS

U.S. Appl. No. 14/259,009, filed Apr. 22, 2014, Mapping and Bridging Wireless Networks to Provide Better Service.

* cited by examiner

*Primary Examiner* — Brandon Miller
(74) *Attorney, Agent, or Firm* — Banner & Witcoff, Ltd.

(57) ABSTRACT

Aspects of the disclosure relate to various approaches to gathering information about access nodes serving in an area and using the information to generate a coverage map. The coverage map may be generated by detecting broadcasted signal strengths from a plurality of access nodes as detected by other access nodes. The broadcasted signal strengths can be used in combination with the location of the access nodes receiving the broadcasted signal to estimate a location of each of the plurality of access nodes. A coverage map may be generated based on the estimated locations of each of the plurality of access nodes using an effective coverage range for each access node based on the access node type. The coverage of each access node may be refined by analyzing signal data received by neighboring nodes. The coverage map may be used to identify unauthorized devices.

20 Claims, 5 Drawing Sheets

DETERMINING WIRELESS COVERAGE INFORMATION USING WIRELESS ACCESS POINTS

CROSS-REFERENCE TO RELATED APPLICATIONS

This application is related to U.S. application Ser. No. 14/259,009 filed on Apr. 22, 2014, entitled "Mapping and Bridging Wireless Networks to Provide Better Service," the disclosure of which is hereby incorporated by reference in its entirety.

FIELD OF ART

Aspects of the disclosure present methods and systems related to determining location information and coverage area information of access nodes using information collected by other access nodes and using such information, for example, for generating coverage data (e.g., maps) of a network such as a telecommunications network and for improving service based on the generated coverage data.

BACKGROUND

Access nodes can be hardware devices that provide users with access to content. For instance, access nodes may be components directly connected to physical communication strands via an interface and may include different types of components, including modems, routers, and other types of gateways. Mobile user devices such as smart phones and laptops may wirelessly access content by communicating with a gateway associated with an access node. Since each access node may have a limited coverage area, it may be desirable to generate a coverage map of access nodes in an area to be used in determining how to improve service in an area.

BRIEF SUMMARY

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Feature herein relate to various approaches to gathering information about access nodes serving in an area and using the information to generate a coverage map. The coverage map may be generated by detecting broadcasted signal strengths from a plurality of access nodes as detected by other access nodes. The broadcasted signal strengths can be used in combination with the location of the access nodes receiving the broadcasted signal to estimate a location of each of the plurality of access nodes. A coverage map may be generated based on the estimated locations of each of the plurality of access nodes using an effective coverage range for each access node based on the access node type. The coverage of each access node may be refined by analyzing signal data received by neighboring nodes.

Aspects of the disclosure relate to using the coverage map to identify unauthorized devices. The coverage map may be used to determine whether an access node has an unauthorized device identifier. The coverage map may be used to track movement of an access node and determine that a moved access node is outside of a predetermined distance from a last known or recorded location. Such a moved access node may be identified as unauthorized.

Aspects of the disclosure relate to using the coverage map to identify areas with a coverage density below a predetermined threshold. The coverage density may be determined based on a number of access nodes within the area.

Aspects of the disclosure may be provided in a system, an apparatus, or a computer-readable medium having computer-executable instructions to perform one or more of the process steps described herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

Figure 1:
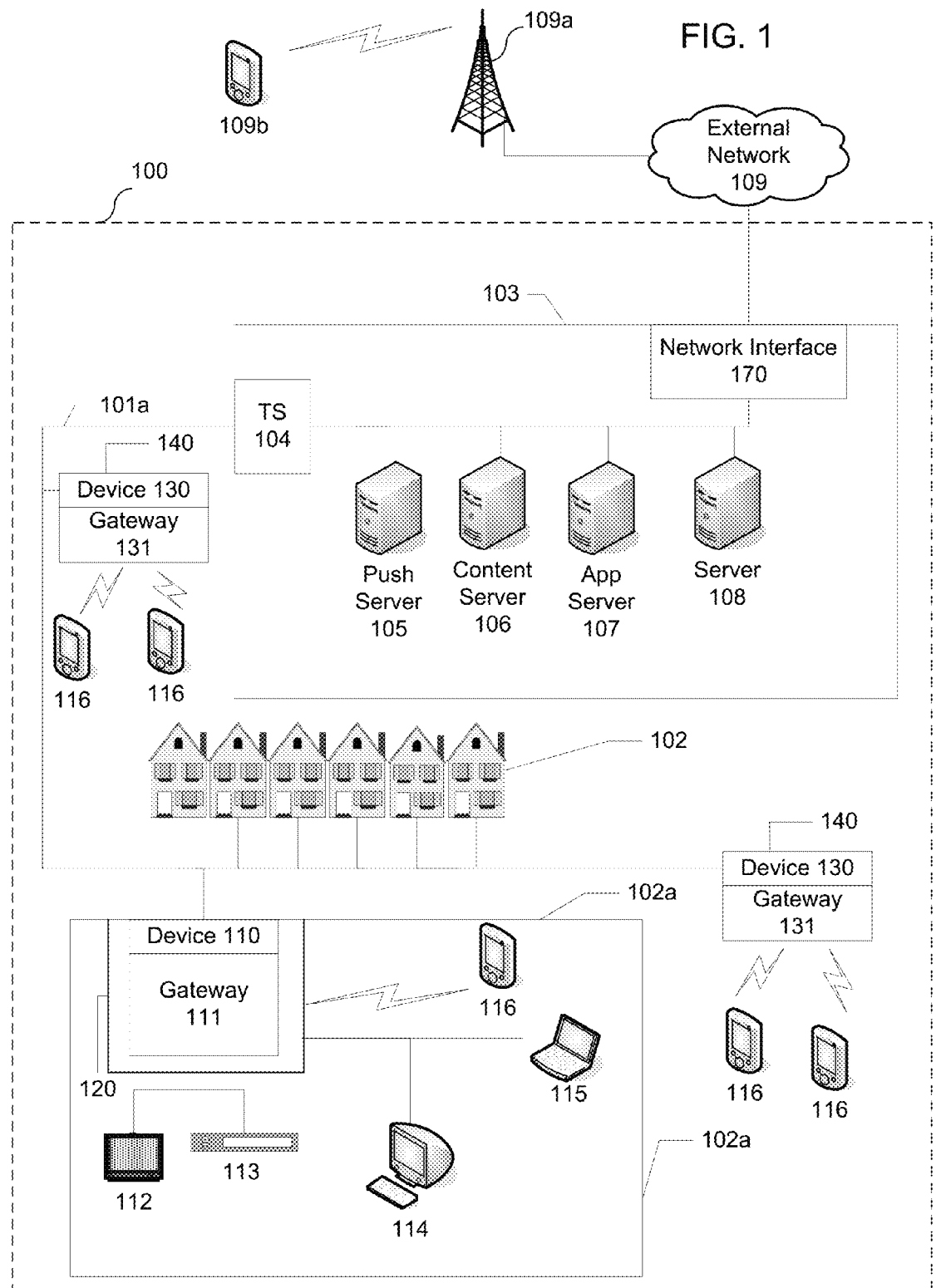
FIG. 1 illustrates an example network in accordance with various aspects of the disclosure.

FIG. 1 illustrates an example network 100, such as a telecommunications or a content delivery network, on which many of the various features described herein may be implemented. One example may be an optical fiber network, a coaxial cable network, or a hybrid fiber/coax (HFC) distribution network. Such networks 100 may use a series of interconnected communication lines 101a (e.g., coaxial cables, optical fibers, wireless links, etc.) to connect access nodes 140 and other locations 102 to a central location or office (e.g., headend 103). The central office 103 may transmit downstream information signals onto the lines 101a to the access nodes 140 and the other locations 102. Each of the access nodes 140 and the other locations 102 may have a receiver used to receive and process those signals.

There may be one line 101a originating from the central office 103, and it may be split a number of times to distribute the signal to various access nodes 140 and other locations 102 in the vicinity (which may be many miles) of the central office 103. Herein, the access nodes 140 may refer to hardware modules including a device 130, such as a modem, and a gateway interface 131. In some aspects, an access node 140 may refer to a wireless (e.g., Wi-Fi, etc.) hotspot that allows various user devices 116 (wireless laptops and netbooks, mobile phones, mobile televisions, personal digital assistants (PDA), etc.) to connect to the network 100 and external networks 109 for access to various content, including content found over the Internet. The device 130 may include transmitters and receivers used to communicate on the lines 101a and with the central office 103. Within a given access node 140, the device 130 may be, for example, a coaxial cable modem (for coaxial cable lines 101a), a fiber interface node (for fiber optic lines 101a), or any other desired device. Meanwhile, the gateway interface device 131 may be a computing device (e.g., a router for wireless (e.g., Wi-Fi, etc.) connectivity, etc.) that communicates with the device 130 to allow one or more wireless devices 116 to communicate with the central office 103 and other devices beyond the central office 103, such as those devices connected to the external networks 109. The gateway interface device 131 may also include wireless network interfaces (not shown) to provide communication signals to wireless devices 116. The access node 140 may transmit more than one wireless network identifier (e.g., SSID). For example, the access node 140 may transmit one network identifier that is configurable by a subscriber or user and another network identifier which is only configurable by the service provider.

Meanwhile, the locations 102 may be any type of user premises, such as homes, businesses, institutions, etc. The lines 101a may include components not illustrated, such as splitters, filters, amplifiers, etc. to help convey the signal clearly, but in general each split introduces a bit of signal degradation. Portions of the lines 101a may also be implemented with fiber-optics, while other portions may be implemented with other types of lines or wireless communication paths.

The central office 103 may include an interface, such as a termination system (TS) 104, which may be a computing device configured to manage communications between devices on the network of lines 101a and backend devices such as servers 105-108 (to be discussed further below). Backend devices such as servers 105-108 may be located in close proximity to one another (e.g., in the same building) and/or far apart (e.g., separate cities, countries, etc.) and may be connected to one another over various communication platforms, including over a cloud computing environment. The termination system 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The termination system 104 may be configured to place data on one or more downstream channels or frequencies to be received by devices 130, 110 (for example, such as modems) at the various access nodes 140 and the other locations 102, and to receive upstream communications from the devices 130, 110 on one or more upstream channels or frequencies. The central office 103 may also include one or more network interfaces 170, which can permit the central office 103 to communicate with various other external networks 109. That is, the network interface 170 may include circuitry needed to communicate with one or more external networks 109 and their corresponding devices. These external networks 109 may include, for example, networks of Internet devices, telephone networks, cellular telephone networks, fiber optic networks, local wireless networks (e.g., WiMAX), satellite networks, and any other desired network. For example, the external network 109 may include a cellular telephone network 109a and its corresponding cell phones 109b.

As noted above, the central office 103 may include a variety of servers 105-108 that may be configured to perform various functions, including providing content to the access nodes 140, the locations 102, cell phones 109b, and other devices on the external networks 109. For example, the central office 103 may include a push notification server 105. The push notification server 105 may generate push notifications to deliver data and/or commands to the access nodes 140 and the other locations 102 in the network 100 (or more specifically, to the devices in the access nodes 140 and the other locations 102 that are configured to detect such notifications). The central office 103 may also include a content server 106. The content server 106 may be one or more computing devices that are configured to provide content to users at the access nodes 140 and/or the locations 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be responsible for collecting data such as television program listings information and generating a data download for electronic program guide listings. Another application server 107 may be responsible for monitoring user viewing habits and collecting that information for use in selecting advertisements. The application server 107 or another application server 107 may be responsible for formatting and inserting advertisements in a video stream being transmitted to access nodes 140 and other locations 102. The application server 107 or another application server 107 may be responsible for receiving user remote control commands, and processing them to provide an intelligent remote control experience.

In addition, the central office 103 may include a server 108 (for example, a node location server) to receive data (e.g., wireless coverage data) collected by various deployed access nodes. The server 108 may analyze the collected data to generate estimate locations of access points unknown to the server 108 and to estimate coverage data (e.g., maps) of the area. In performing these functions, server 108 may also request, collect, store, and analyze various data from the access nodes 140 including system information (e.g., maps), and/or wireless (e.g., Wi-Fi) received signal strength indicator (RSSI) levels, SSID, communication channel information, and device identifier information of access points operating in the area.

An example location 102a (e.g., one of the locations 102) may include an interface 120. Similar to an access node 140, the interface 120 may comprise a device 110, such as a modem, which may also include transmitters and receivers used to communicate on the lines 101a and with the central office 103. The device 110 may be connected to, or be a part of, a gateway interface device 111. Similar to gateway interface device 131, the gateway interface device 111 may be a computing device that communicates with the device 110 to allow one or more other devices at the location 102a to communicate with the central office 103 and other devices beyond the central office 103, such as those devices connected to the external networks 109. In some embodiments, the gateway interface device 111 may operate to communicate with devices 112-116 located over a smaller distance than the distance between gateway interface device 131 and the user devices 116. The gateway interface device 111 may be a set-top box (STB), digital video recorder (DVR), computer server, or any other desired computing device. The gateway interface device 111 may also include local network interfaces (not shown) to provide communication signals to the devices 112-116 at the location 102a, such as televisions 112, additional STBs 113, personal computers 114, laptop computers 115, wireless devices 116 (wireless laptops and netbooks, mobile phones, mobile televisions, personal digital assistants (PDAs), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
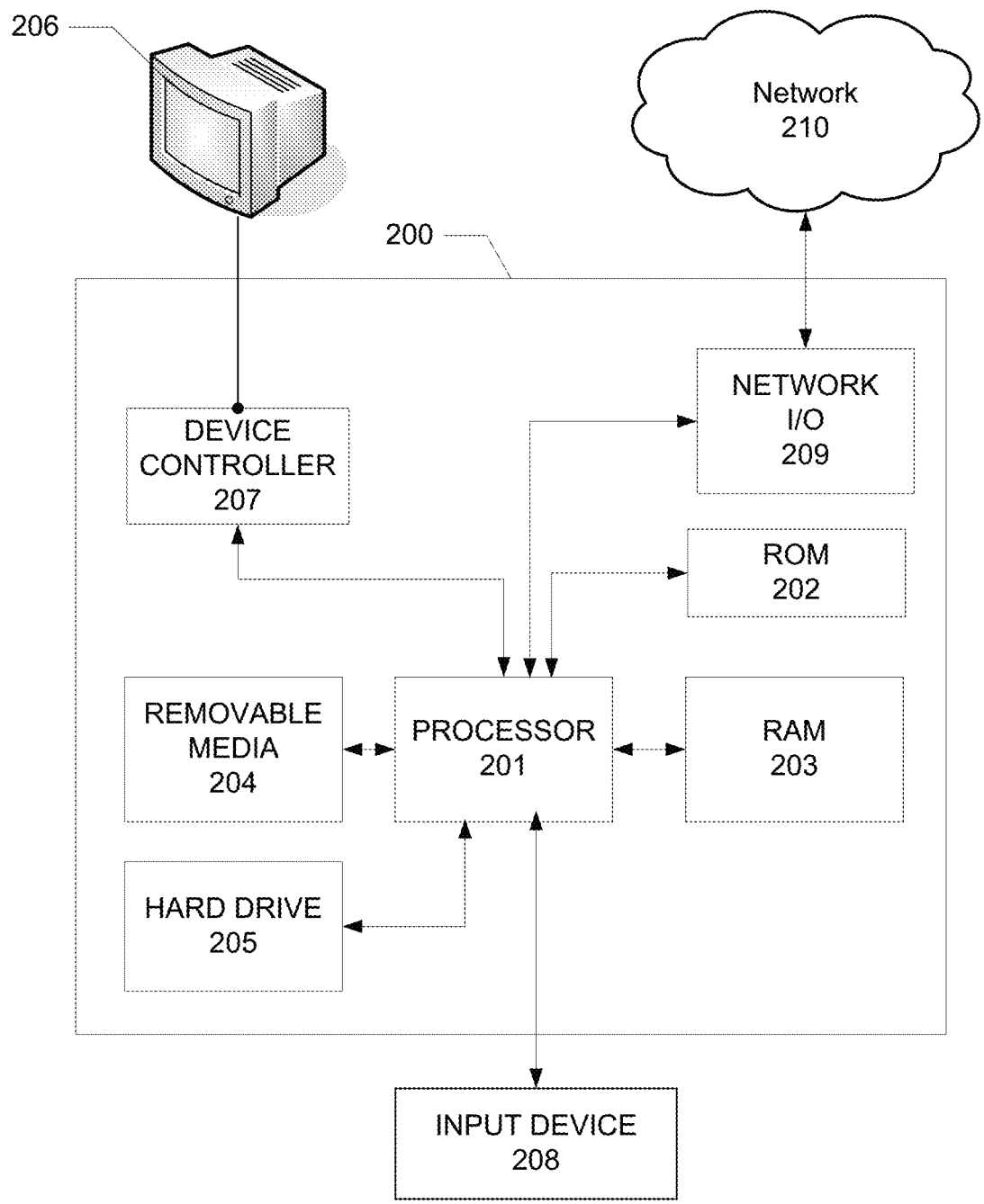
FIG. 2 illustrates an example of a hardware and/or software platform on which various elements described herein can be implemented in accordance with various aspects of the disclosure.

FIG. 2 illustrates general hardware and/or software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or a digital versatile disk (DVD) drive, and/or a floppy disk drive, or any other desired electronic storage medium. Instructions and/or other data may also be stored in an attached (or internal) hard drive and/or a data repository 205. The computing device 200 may include one or more output devices, such as a display 206, and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (e.g., a network card) to communicate with a network 210. The input/output circuits 209 may include a network interface, such as, for example, a wired interface, wireless interface, or a combination of the two. In some embodiments, the input/output circuits 209 may include a device (e.g., a cable modem), and the network 210 may include the communication lines 101a discussed above, the external network 109, an in-home network, a provider's wireless, coaxial, fiber, or hybrid fiber/coaxial distribution system (e.g., a DOCSIS network), or any other desired network.

One or more computing devices discussed herein may include some or all of the components discussed in FIG. 2, along with additional components.

Figure 3:
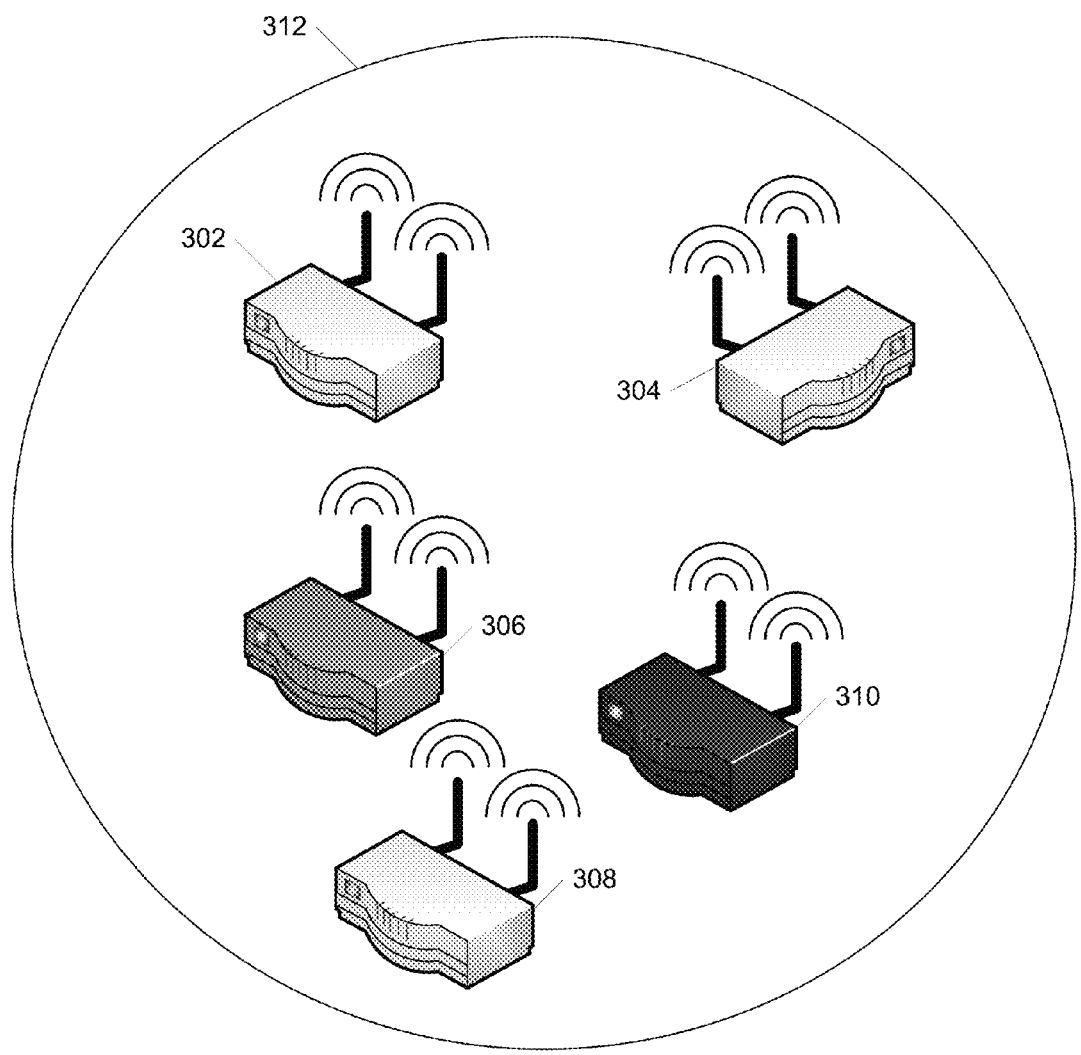
FIG. 3 illustrates an example of a plurality of wireless access nodes providing service in an area.

FIG. 3 shows an example of wireless access nodes within and serving a particular area. The scenario of FIG. 3 shows a plurality of wireless access nodes 302, 304, 306, 308, 310 located within an area 312 and associated with various service providers. The wireless access nodes may be the access nodes 140 shown in FIG. 1 and may be in the same or different networks 100. The wireless access nodes may form part of a wireless local area network (WLAN) and provide access to a communication network. For example, the wireless access nodes 302, 304, 308 may be associated with a first service provider. The access nodes 302, 304, and 308 may be the access nodes 140 in network 100 connected via lines 101a to the central office 103, and these nodes 302, 304, 308 may broadcast the same network identifier (e.g., service set identification (SSID)).

The wireless access node 306 may be associated with a second service provider and broadcast a network identifier associated with the second service provider. For example, the wireless access node 306 may be part of another network operated by a different service provider. The network may be similar to the network shown in FIG. 1. The wireless access node 310 may be part of a network operated by a third service provider and broadcast a network identifier associated with the third service provider.

The wireless access nodes 302, 304, 306, 308, 310 may be wireless access points (e.g., wi-fi) in accordance with IEEE 802.11 standards. In order to facilitate the discovery of the access node by user devices, an access node may broadcast network information including a network identifier, network mode, and a device identifier such as a medium access control (MAC) address of the wireless access node. The user devices may receive the broadcast signal, which may be a beacon signal at a particular signal strength depending on a variety of factors including distance from the broadcasting node, interference, and surrounding environment (e.g., buildings, objects, geographical features, elevation). The received signal strength of the broadcast signal may be a received signal strength indication (RSSI). The wireless access nodes 302, 304, 306, 308, 310 may broadcast the beacon signals on the same or different communication channels such as different frequency channels. These channels may be channels defined by the IEEE 802.11 standards.

The user devices can receive the broadcast signals comprising information about the network and the device, and determine which access nodes and networks are in an area. Based on this information, a user can choose which access node and network to use. A service provider may also use the broadcast signals to determine which access nodes and networks are operating in an area. The service provider may use equipment already located within the area for this purpose.

In some aspects, the system may have knowledge of the designed coverage range of each access node model. Based on the designed coverage range, an initial coverage of the access node can be estimated. Since coverage may be affected by environmental factors, the contours of the initial coverage of the access node may be refined to reflect environmental factors (e.g., interference, fading, elevation, buildings, trees, and the like) by examining signals of the access node received by other access nodes in the area.

Figure 4:
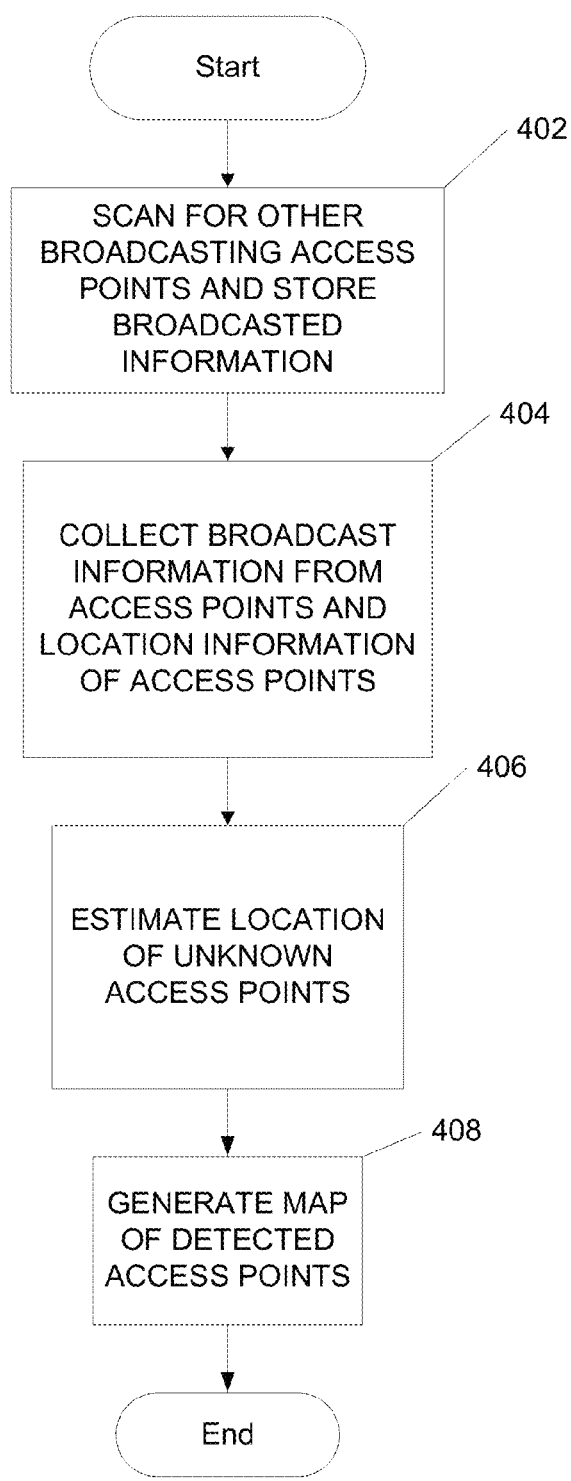
FIG. 4 illustrates an example of a method for generating a map of estimated access nodes.

FIG. 4 provides an exemplary method of estimating locations of wireless access nodes using information collected by other wireless access nodes. At step 402, the access node may scan other broadcasting access points and may store the broadcasted information. For example, in step 402, an access node may conduct a radiofrequency (RF) survey of other access nodes broadcasting on each channel. For example, the access node 302 may scan each channel for broadcast signals from other access nodes. There may be 11 wireless communication channels (e.g., frequency channel) in use, and the access node may determine the access nodes transmitting on each communication channel and collect information about each access node including the network identifier being transmitted by each access node, the network mode, and device identifier (e.g., MAC address) of the transmitting access node. For example, from the RF survey, the access node 302 can obtain device identifiers (e.g., MAC addresses), network identifiers (e.g., SSIDs), and network mode (e.g., ad-hoc, infrastructure) of the other access nodes 304, 306, 308, 310 in communication range with the access node 302. The access node 302 may store this information in a memory to be used in combination with information collected by other access nodes to generate a location map of access nodes in the area 312.

At step 404, an access node and/or a server may collect broadcast information from the access nodes and location information of the access nodes. For example, the access node 302 may receive the broadcast information (e.g., information obtained in the RF survey conducted in step 402) from the access nodes 304, 306, 308, 310. For example, the server 108 may receive the broadcast information from the access nodes 302, 304, 306, 308, 310. The information may be collected only from other access nodes of the same provider as the collecting device.

In some aspects, an access node may collect the information from other access nodes such as other access nodes associated with the same service provider as the collecting access node. For example, the access node 302 may identify access nodes within communication range of the access node 302 that are associated with the same service provider. The access node 302 may identify other access nodes associated with the same service provider using information gathered in the RF survey such as device identifiers and/or network identifiers. An access node may have knowledge of or access to the device identifiers (e.g., MAC addresses) of the other access nodes associated with the same service provider, for example, by receiving information about the other access nodes from the server 108. Using the device identifiers collected in the RF survey, the access node 302 may determine that the access nodes 304, 308 are part of the same network as the access node 302 or operated by the same service provider. According to another aspect, the access node 302 may identify the other access nodes based on the broadcasted network identifier (e.g., SSID). For example, the first service provider may use the same SSID across all of the public access nodes of the first service providers to enable customers to easily identify the first service provider's networks. After identifying other access nodes serviced by the first service providers, the access node 302 may request RF survey information from the access nodes 304, 308 and/or location information of the access nodes 304, 308. The access nodes 304, 308 may also periodically send the RF survey information to the access node 302 according to a transmission schedule. The access node 302 may retrieve location information of the access nodes 304, 308 from a server such as the server 108. The location information provided by server 108 may be coordinates of the physical last known location of the access nodes 304, 308. The last known location may be the most recently confirmed location of the access node. For example, the last known location may be an installation location provided by the installer or may be a location determined or estimated as described herein based on a RF survey. The last known location may further be manually updated by service personnel.

In some aspects, the access points may transmit the data to a server 108 in the central office 103 of the network 100. The server 108 may be located in the central office 103 of the first service provider and may collect and store survey information received from access nodes associated with the first service provider. After scanning each channel for broadcast signals, each access node may send the server 108 the information collected during the survey. The server 108 may have access to or store information regarding the physical location of each of the access nodes. The access node 302 can also calculate the strength of the broadcast signal received by the access node 302 such as a RSSI. While steps 402-406 have been described with respect to the access node 302, each of the access nodes may be independently conducting RF surveys and determining access points within their vicinities.

At step 406, locations of unknown access points may be estimated based on broadcast signal properties such as the received signal strength. Using the received signal strength, each of the access nodes may estimate the distance between the access nodes and that of the access point from which the signals originated. For example, with respect to the scenario of FIG. 3, to estimate the location of the access node 306, each of the access nodes 302, 304, 308 may receive a signal transmitted from the access node 306 and estimate the distance between access node 306 and each of the access nodes 302, 304, 308. During service provisioning of the access nodes 302, 304, 308, the first service provider may record device locations of each of the access nodes 302, 304, 308, for example, using a geographic coordinate system (e.g., latitude and longitude, global position system (GPS) coordinates, etc.). Based on the locations of the access nodes 302, 304, 308 and the strength of the signal from the access node 306 received at each of the access nodes 302, 304, 308 a location of the access node 306 may be estimated based on signal triangulation. For example, by analyzing the signal strengths received by each of the access nodes 302, 304, 308 and the locations of the access nodes 302, 304, 308, an estimated location of the access node 306 may be determined. The estimated location may be a range of locations in which the node 306 may be located. An estimate of the location of access node 310 may also be determined in a manner similar to estimating the location of the access node 306.

At step 408, a map may be generated of the detected access points within the area 312 based on the known locations of the access nodes 302, 306, 308 and the estimated locations of the access node 306 and the access node 310. The generated map may be stored with a timestamp of the data collection time or the time at which the map was generated. The map may be updated periodically by scanning each communication channel and generating an updated map.

Based on the exemplary method of FIG. 4, a determination can be made of the types, number, and coverage of access nodes within a particular area using access nodes located within or near the area.

In some aspects, the computing device may have geographic coordinates and device information stored for access nodes in an area. Based on the device information, an effective range of the device may be known. Using access node location information estimated as described herein or stored locations of devices, a coverage map may be generated with each access node having a range equal to its effective range. Since a variety of factors may affect actual coverage (e.g., interference, geography, elevation, buildings, trees), the coverage of an access node may be refined using the captured signal strengths (e.g., RSSI) of the devices. For example, based on the effective range of the first access node, a request may be sent to other access nodes within the effective range of the access node to determine whether the other access nodes can actually receive signals from the first access node. If the other access nodes can receive signals from the first access node, the access node may further respond with the received signal strength (e.g. RSSI) of the first access node. By querying access nodes within the effective range of the first access node, the coverage of the first access node can be refined based on whether other access nodes can receive signals and the signal strength of the signal received by the other access nodes.

According to another aspect, the coverage map may identify the central office 103 to which each access node 120, 140 is connected. More than one central office 103 may be serving nodes in a particular area. A server (e.g., server 108) may receive coverage information gathered by the access nodes connected to same central office 103 as the server 108. For the access nodes that are not connected to the same central office 103 as the server 108, the server 108 may transmit a request to other central offices requesting information on whether the other central offices are connected to certain access nodes, which may be identified based on a device identifier. The request may be transmitted via various paths including through connections between various central offices.

Based on the generated map and estimated location information of access nodes associated with a different provider, a service provider can analyze the location information to determine weak spots in the service provider's coverage and the coverage of other service providers. The illustrative method of FIG. 4 is also beneficial since a service provider may use access nodes already deployed within an area to estimate the deployment of access nodes in the area by the service provider and other service providers. A service provider may also be better able to monitor their networks for unauthorized devices by having knowledge of all access nodes providing service in an area.

Figure 5:
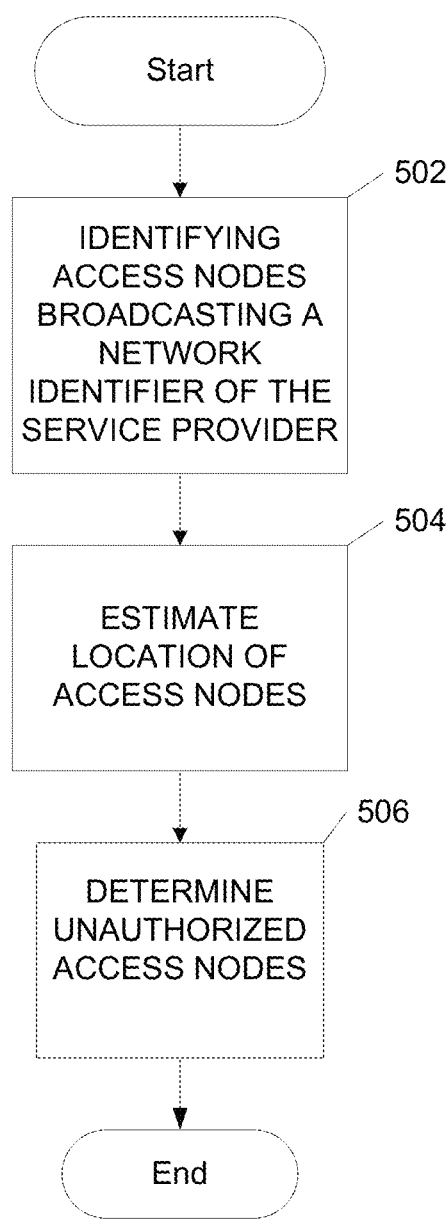
FIG. 5 illustrates an example of a method for identifying unauthorized access nodes.

FIG. 5 illustrates a flowchart of a method of identifying and locating unauthorized access points. At step 502, the access nodes or a computing device of a service provider may identify the access nodes broadcasting a network identifier (e.g., SSID) associated with the service provider from a coverage map. Unauthorized devices may be devices that broadcast a network identifier associated with the service provider but is not a device authorized to broadcast the service provider's network identifier according to the device's device identifier. An unauthorized device may be a device located outside of an authorized area. For example, a server associated with the service provider may store a last known or recorded location of the device. If an updated location of the device is obtained that is a specific distance away from the last known or recorded location of the device, the device may be identified as unauthorized.

A computing device can determine neighboring access nodes of the potentially unauthorized device that may be able to receive the broadcast signal of the potentially unauthorized device based on the coverage map. As discussed above, access nodes may continuously broadcast network information to enable wireless devices to discover the access node and connect to the access node to access a communication network. The broadcasted information may include a network identifier (e.g., SSID) and the broadcasting device's identifier (e.g., MAC address). The network identifier may be a network identifier broadcasted by more than one access node. The network identifier may also be a unique network identifier associated with a particular location or subscriber. The service provider can use access nodes associated with the service provider to detect all access points that are operating within a vicinity of service provider's access nodes including the service providers of other access nodes. The service provider can receive the broadcast signal information from its associated access nodes and check whether each access node broadcasting a network identifier associated with the service provider is authorized to do so. For example, the service provider may maintain a database of deployed access nodes and information of the deployed access nodes such as authorized SSIDs, location information, device identification information (MAC address, serial number, etc.).

At step 504, the system can estimate locations of access nodes broadcasting a network identifier associated with the service provider using aspects described herein. At step 506, the service provider can determine any unauthorized access nodes. For example, the service provider can determine whether a device broadcasting the service provider's network identifier (e.g., SSID) is an authorized device. This may be performed, for example, by determining whether the device's identification information (e.g., MAC address, serial number) is stored in the database as a device authorized to broadcast the service provider's SSID or whether the device's location as estimated based on data gathered from neighboring nodes is within a predetermined distance or area of the recorded location of the device. Devices greater than the predetermined distance away from the recorded location or outside of the predetermined area may be flagged as unauthorized devices. The database may also contain information regarding or associated with devices of other service providers who are authorized to use the service provider's SSID.

In response to determining that the device is an unauthorized device, the account associated with the unauthorized device may be flagged, the information associated with the account may be reconfirmed, or service to the unauthorized device may be discontinued.

In response to determining that a particular device is not authorized to broadcast the network identifier that the particular device is broadcasting, the system can estimate the location of the unauthorized device based on the signal being broadcasted by the device according to aspects of the disclosure described herein such as the method shown in FIG. 4.

Using a coverage map generated for example from the method described with respect to FIG. 4, the service provider is able to obtain an overall picture of coverage by various service providers in areas where the service provider has nodes deployed. Within detection ranges of a service provider's nodes, the service provider can obtain a picture of its own network coverage as well as that of other service providers. For example, the service provider can analyze the density of access nodes in different areas as well as received signal strengths of the access nodes. The service provider may be able to determine areas where signal strengths are below an acceptable threshold.

A network 100 may store system information (e.g., maps, device information, subscriber account information, coverage information) in any database associated with the central office 103. System information may depict, for example, the communication backhaul of the network 100. The server 108 may use system information (e.g., maps of the network 100) to pinpoint possible locations of an access node 140. In some aspects, the server 108 may use wireless (e.g., Wi-Fi) information to determine the distance between an access node 140 from which a wireless signal is being transmitted and another access node. The server 108 may determine this distance by collecting wireless information (e.g., Wi-Fi RSSI levels) from an access node 140, other neighboring access nodes 140, and/or the user devices 116 connecting to the access node 140.

Although the subject matter disclosed herein has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving, from a first access node and at a second access node, an indication of a first signal strength of a signal wirelessly broadcasted from the second access node;
receiving, from a third access node and at the second access node, an indication of a second signal strength of the signal wirelessly broadcasted from the second access node;
generating, at the second access node, a map comprising a plurality of estimated locations of a plurality of access nodes, wherein the map comprises an estimated location of the second access node based on the first signal strength detected by the first access node and the second signal strength detected by the third access node;
identifying a potentially unauthorized access node; and
determining an estimated location of the potentially unauthorized access node based on the map.

2. The method of claim 1, wherein the identifying the potentially unauthorized access node comprises:
receiving a broadcast signal comprising a network identifier associated with a first provider, a signal strength indicator, and an access node identifier associated with the potentially unauthorized access node; and
determining whether the access node identifier matches an authorized access node identifier.

3. The method of claim 2, further comprising:
in response to determining that the access node identifier matches the authorized access node identifier, determining whether the estimated location of the potentially unauthorized access node is within a predetermined distance of a recorded location of an authorized access node associated with the authorized access node identifier.

4. The method of claim 3, further comprising:
in response to determining that the estimated location of the potentially unauthorized access node is greater than the predetermined distance from the recorded location of the authorized access node, flagging an account associated with the authorized access node.

5. The method of claim 2, further comprising:
in response to determining that the access node identifier associated with the potentially unauthorized access node is absent from a database of authorized access nodes, identifying the potentially unauthorized access node as an unauthorized access node.

6. The method of claim 2, wherein the access node identifier comprises a media access control (MAC) address.

7. The method of claim 1, further comprising:
determining a number of access nodes in each of a plurality of areas;
determining a coverage density for each of the plurality of areas based on the number of access nodes in each of the plurality of areas;
determining low density areas having a density less than a predetermined value from the plurality of areas; and
identifying the low density areas on the map.

8. The method of claim 1, further comprising:
determining one or more communication channels in use in a first area; and
in response to a determination that a number of access nodes using a first communication channel of the one or more communication channels is greater than a predetermined value, changing a communication channel of an access node associated with a first provider using the first communication channel to a second communication channel different from the first communication channel.

9. The method of claim 1, wherein the signal wirelessly broadcasted from the second access node comprises a beacon frame.

10. The method of claim 1, further comprising:
determining which of the plurality of access nodes have overlapping coverage with the potentially unauthorized access node; and
identifying one or more access nodes having overlapping coverage with the potentially unauthorized access node as neighboring access nodes.

11. A method, comprising:
receiving, from a first access node and at a second access node, an indication of a first signal strength of a signal wirelessly broadcasted from the second access node;
receiving, from a third access node and at the second access node, an indication of a second signal strength of the signal wirelessly broadcasted from the second access node;
generating, at the second access node, a map comprising a plurality of estimated locations of a plurality of access nodes, wherein the map comprises an estimated location of the second access node based on the first signal strength detected by the first access node and the second signal strength detected by the third access node; and
identifying an area on the map with a coverage density below a predetermined threshold, wherein the coverage density is determined based on a first number of access nodes within the area.

12. The method of claim 11, comprising:
determining that an access node of the plurality of access nodes is an unauthorized access node in response to a determination that a distance between an estimated location of the access node and a recorded estimated location of the access node is greater than a predetermined distance.

13. The method of claim 11, comprising:
determining one or more communication channels in use in a first area; and
in response to a determination that a second number of access nodes using a first communication channel of the one or more communication channels is greater than a predetermined value, changing a communication channel of an access node associated with a first provider using the first communication channel to a second communication channel different from the first communication channel.

14. The method of claim 11, comprising:
identifying the second access node as having overlapping coverage with the first access node and the third access node.

15. The method of claim 11, comprising:
in response to determining that an access node identifier of the second access node is absent from a database of authorized access nodes, identifying the second access node as an unauthorized access node.

16. A method, comprising:
broadcasting, by a particular access node and to a plurality of access nodes, a broadcast signal;
receiving, by the particular access node and from the plurality of access nodes, a plurality of received signal strength indicators (RSSIs) of the broadcast signal;

generating, by the particular access node, a map estimating locations of the plurality of access nodes based on the plurality of RSSIs; and identifying an area on the map with a coverage density below a predetermined threshold, wherein the coverage density is determined based on a number of access nodes within the area.

17. The method of claim 16, further comprising:

determining that an access node of the plurality of access nodes is an unauthorized access node in response to a determination that a distance between an estimated location of the access node and a recorded estimated location of the access node is greater than a predetermined distance.

18. The method of claim 17, further comprising:

identifying, on the map, one or more access nodes having overlapping coverage with the unauthorized access node.

19. The method of claim 16, wherein the generating the map estimating the locations of the plurality of access nodes further comprises:

estimating a first location of a first access node associated with a first service provider; and estimating a second location of a second access node associated with a second service provider different from the first service provider.

20. The method of claim 16, further comprising:

prior to generating the map, receiving, from an access node of the plurality of access nodes, one or more RSSIs respectively associated with one or more other access nodes.

* * * * *